(12) United States Patent
Ouyang et al.

(10) Patent No.: US 10,527,789 B2
(45) Date of Patent: Jan. 7, 2020

(54) PHOTONIC CRYSTAL ALL-OPTICAL OR-TRANSFORMATION LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 269 days.

(21) Appl. No.: 15/626,232

(22) Filed: Jun. 19, 2017

(65) Prior Publication Data

US 2017/0307822 A1 Oct. 26, 2017

Related U.S. Application Data

(63) Continuation of application No. PCT/CN2015/097852, filed on Dec. 18, 2015.

(30) Foreign Application Priority Data

Dec. 19, 2014 (CN) .......................... 2014 1 0796582

(51) Int. Cl.
| | |
|---|---|
| *G02B 6/122* | (2006.01) |
| *G02F 3/00* | (2006.01) |
| *G02B 6/125* | (2006.01) |
| *G02F 1/365* | (2006.01) |
| *G02B 6/12* | (2006.01) |

(52) U.S. Cl.
CPC ........... *G02B 6/1225* (2013.01); *G02B 6/125* (2013.01); *G02F 1/365* (2013.01); *G02F 3/00* (2013.01); *G02B 2006/1213* (2013.01)

(58) Field of Classification Search
CPC ........ G02F 3/00; G02F 1/365; G02F 2201/06; G02F 2203/32; G02B 6/1223; G02B 6/1225; G02B 6/125
See application file for complete search history.

*Primary Examiner* — Robert E. Tallman
(74) *Attorney, Agent, or Firm* — Zhihua Han; Wen IP LLC

(57) ABSTRACT

A photonic crystal (PhC) all-optical OR-transformation logic gate, which comprises an optical-switch unit (OSU), a PhC-structure unit, a reference light, a wave-absorbing load (WAL) and a D-type flip-flop (DFF) unit; two system-signal-input ports are respectively connected with a first logic-signal $X_1$ and a second logic-signal $X_2$; the reference light is connected with the reference-light-input port of the OSU; three intermediate-signal-output ports are respectively connected with two intermediate-signal-input ports of the PhC-structure unit and the WAL; a clock-signal CP through the input port of a two-branch waveguide are respectively connected with a first clock-signal CP input port of the OSU and a second clock-signal-CP-input port of the DFF unit; the signal-output port of the PhC-structure unit is connected with the D-signal-input port of the DFF unit. The structure of the present invention is compact in structure, strong in anti-interference capability and ease of integration with other optical-logic elements.

11 Claims, 3 Drawing Sheets

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |

FIG. 4

PHOTONIC CRYSTAL ALL-OPTICAL OR-TRANSFORMATION LOGIC GATE

CROSS-REFERENCE TO RELATED APPLICATION

This application is a continuation application of PCT Application No. PCT/CN2015/097852 filed on Dec. 18, 2015 which claims priority to Chinese Application No. 201410796582.9 filed on Dec. 19, 2014, the entire contents of which are hereby incorporated by reference.

FIELD OF THE INVENTION

The present invention relates generally to two-dimensional (2D) photonic crystal (PhC) optical OR-transformation logic gates.

BACKGROUND OF THE INVENTION

In 1987, the concept of PhC was proposed separately by E. Yablonovitch from United States Bell Labs who discussed how to suppress spontaneous radiation and by S. John from Princeton University who made discussions about photonic localization. A PhC is a material structure in which dielectric materials are arranged periodically in space, and is usually an artificial crystal consisting of two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhCs and devices thereof have continually and rapidly marched towards all-optical processing, and the PhC has become a breakthrough for photonic integration. In December 1999, the PhC was recognized by the American influential magazine Science as one of the top-ten scientific advances in 1999, and therefore has become a hot topic in today's scientific research field.

An all-optical-logic device mainly includes an optical amplifier-based logic device, a nonlinear loop mirror logic device, a Sagnac interference-type logic device, a ring-cavity logic device, a multi-mode-interference logic device, an optical-waveguide-coupled logic device, a photo isomerized logic device, a polarization-switch optical-logic device, a transmission-grating optical-logic device, etc. These optical-logic devices have the common short coming of large size in developing large-scale integrated optical circuits. With the improvement of science and technology in recent years, people have also done research and developed quantum-optical-logic devices, nanomaterial-optical-logic devices and PhC-optical-logic devices, which all conform to the dimensional requirement of large-scale optical integrated circuits. For modern manufacturing processes, however, the quantum-optical-logic devices and the nanomaterial optical-logic devices are very difficult to be manufactured, whereas the PhC-optical-logic devices have competitive advantages in terms of manufacturing process.

In recent years, PhC-logic devices have become a hot area of research drawing widespread attentions, and it is highly likely for them to replace the current widely-applied electronic-logic devices in the near future. The PhC-logic device can directly realize all-optical-logical functions, such as "AND", "OR", "NOT" and the like, and is a core device for realizing all-optical computing. In the process of realizing all-optical computing, PhC-logical function devices based on "AND", "OR", "NOT", "XOR" and the like have been successfully designed and investigated, and various complex logic components are still needed for achieving the goal of all-optical computing.

SUMMARY OF THE INVENTION

The present invention is aimed at overcoming the defects of the prior art and providing a PhC all-optical OR-transformation logic gate with compact structure, strong anti-interference capability, and ease of integration with other optical-logic elements.

The technical proposal adopted by the invention to solve the technical problem is as follows:

The PhC all-optical OR-transformation logic gate of the present invention comprises an optical switch unit (OSU), a PhC-structure unit, a reference light, a wave-absorbing load (WAL) and a D-type flip-flop (DFF) unit; two system-signal-input ports are respectively connected with a first logic-signal $X_1$ and a second logic-signal $X_2$; the reference-light source is connected with the reference-light-input port of the OSU; three intermediate-signal-output ports are respectively connected with two intermediate-signal-input ports of the PhC-structure unit and the WAL; a clock-signal CP is input into the input port of a two-branch waveguide which connects with a first clock-signal-CP-input port of the OSU and a second clock-signal-CP-input port of the DFF unit, respectively; the signal-output port of the PhC-structure unit is connected with the D-signal-input port of the DFF unit.

The OSU is a 3×3 optical-selector switch; the OSU comprises a first clock-signal-CP-input port, two system-signal-input ports, a reference-light-input port and three intermediate-signal-output ports; the two system-signal-input ports are respectively the first logic-signal-input port and the second logic-signal-input port; the three intermediate-signal-output ports are respectively the first intermediate-signal-output port, the second intermediate-signal-output port and the third intermediate-signal-output port.

The PhC-structure unit is a 2D-PhC cross-waveguide nonlinear cavity; the PhC-structure unit is a 2D-PhC cross-waveguide four-port network formed by high-refractive-index dielectric pillars, a left port of the four-port network is the first intermediate-signal-input port, a lower port is the second intermediate-signal-input port, an upper port is the signal-output port, and a right port is an idle port; two mutually-orthogonal quasi-1D PhC structures are placed in two waveguide directions crossed at a center of a cross waveguide, a dielectric pillar is arranged in the middle of the cross-waveguide, a dielectric pillar is made of a nonlinear material, a cross section of the dielectric pillar is square, polygonal, circular or oval; the dielectric constant of a rectangular linear pillar clinging to the central nonlinear pillar and close to the signal-output port is equal to that of the central nonlinear pillar under low-light-power conditions; and the quasi-1D PhC structures and the dielectric pillar constitute a waveguide defect cavity.

The DFF unit comprises a clock-signal-input port, a D-signal-input port and a system-output port; the input signal at the D-signal-input port of the DFF unit is equal to the output signal at the output port of the PhC-structure unit.

The 2D PhC is a (2k+1)×(2k+1) array structure, where k is an integer more than or equal to 3.

The cross section of the high-refractive-index dielectric pillar of the 2D PhC is circular, oval, triangular or polygonal.

A background filling material for the 2D PhC is air or a different low-refractive-index medium with the refractive index less than 1.4.

The refractive index of the dielectric pillar in the quasi-1D PhC of the cross waveguide is 3.4 or a different value more than 2; the cross section of the dielectric pillar is rectangular, polygonal, circular or oval.

Compared with the prior art, the present invention has the following advantages:

1. Compact in structure, and ease of manufacture;
2. Strong anti-interference capability, and ease of integration with other optical-logic elements; and
3. High contrast of high and low logic outputs, and fast operation.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, the indications are: OSU 01, first logic-signal-input port 11, second logic-signal-input port 12, reference-light-input port 13, first intermediate-signal-output port 14, second intermediate-signal-output port 15, third intermediate-signal-output port 16, first clock-signal-input port, PhC-structure unit 02, first intermediate-signal-input port 21, second intermediate-signal-input port 22, idle port 23, signal-output port 24, circular high-refractive-index linear-dielectric pillar 25, first rectangular high-refractive-index linear-dielectric pillar 26, second rectangular high-refractive-index linear-dielectric pillar 27, nonlinear-dielectric pillar 28, first logic-signal $X_1$, second logic-signal $X_2$, reference-light 03, reference-light E, WAL 04, DFF unit 05, second clock-signal-input port 51, D-signal-input port 52, and system-output port 53.

FIG. 4 is a truth table of the logic functions of a 2D-PhC cross-waveguide nonlinear cavity shown in FIG. 1.

The present invention is more specifically described in the following paragraphs by reference to the drawings attached only by way of example.

DETAILED DESCRIPTION OF THE EMBODIMENTS

The terms a or an, as used herein, are defined as one or more than one, the term plurality, as used herein, is defined as two or more than two, and the term another, as used herein, is defined as at least a second or more.

Figure 1:
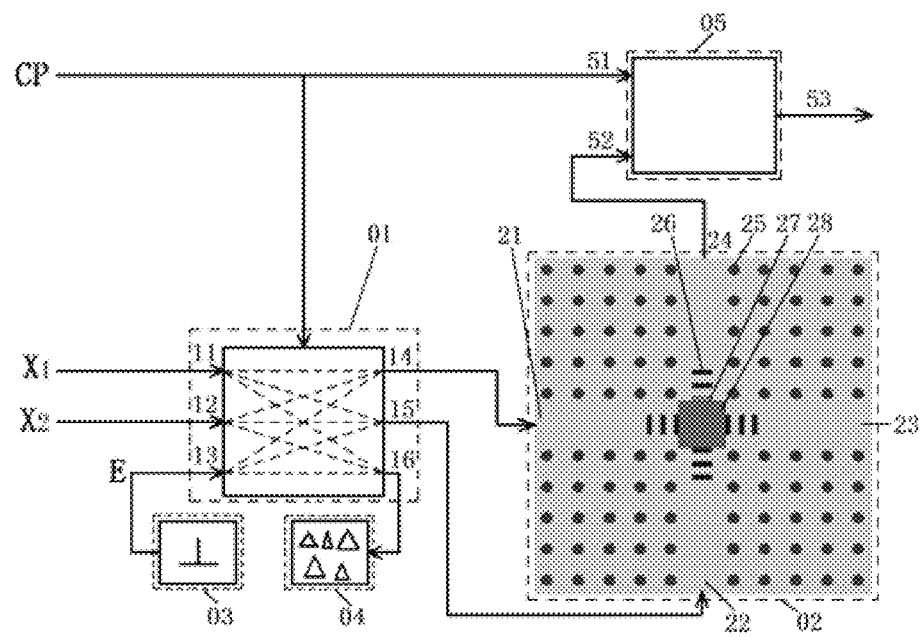
FIG. 1 is a structural schematic diagram of a PhC all-optical OR-transformation logic gate of the present invention.

As shown in FIG. 1, the PhC all-optical OR-transformation logic gate of the present invention comprises an OSU 01, a PhC-structure unit 02, a reference-light source 03, a WAL 04 and a DFF unit 05; the OSU 01 is a 3×3 optical-selector switch controlled by a clock-signal CP, used for controlling and selecting a logic signal for outputting, the clock-signal CP controls three input port signals for selective output as the logic input of next stage of PhC-structure unit 02; and the OSU comprises a first clock-signal-CP-input port, two system-signal-input ports, a reference-light-input port and three intermediate-signal-output ports; and two system-signal-input ports are respectively a first logic-signal-input port and a second logic-signal-input port; and three intermediate-signal-output ports are respectively a first intermediate-signal-output port, a second intermediate-signal-output port and a third intermediate-signal-output port; the first logic-signal-input port 11, the second logic-signal-input port 12 and the reference-light input 13 of the OSU 01 are respectively input from the first logic-signal $X_1$, the Second logic-signal $X_2$ and the reference-light E; first logic-signal $X_1$ is connected with the first logic-signal-input port 11 of the OSU 01, and second logic-signal $X_2$ is connected with the second logic-signal-input port 12 of the OSU 01; reference-light E output by the reference-light source 03 is connected with the reference-light-input port 13 of the optical-selector switch, and the reference-light E output by the reference-light is 1; the first intermediate-signal-input port 21 of the PhC-structure unit 02 is connected with the first intermediate-signal-output port 14 of the OSU 01, the second intermediate-signal-input port 22 of the PhC-structure unit 02 is connected with the second intermediate-signal-output port 15 of the OSU 01 and the three intermediate-signal-output port 16 of the OSU 01 is connected with the WAL 04. the WAL is used for absorbing light wave entering it; the DFF unit 05 comprises a clock-signal-input port, a D-signal-input port and a system-output port; a clock-signal CP is input through the input port of a two-branch waveguide, one port of the two-branch waveguide is connected with the first clock-signal-CP-input port of the OSU 01, and another port of the two-branch waveguide is connected with the second clock-signal-input port 51 of the DFF unit 05; the D-signal-input port 52 of the DFF unit 05 is connected with the signal-output port 24 of the PhC-structure unit 02, i.e., the input-signal of the D-signal-input port 52 of the DFF unit 05 is equal to the output signal of the output port of the PhC-structure unit; the DFF unit 05 takes the output signal at the output port of the PhC-structural unit 02 for an input-signal D; the system-signal-output port 53 of the DFF unit 05 is the system-output port of the PhC all-optical OR-transformation logic gate of the present invention; the PhC-structure unit 02 is a 2D-PhC cross-waveguide nonlinear cavity and is arranged behind the OSU, the background filling material for the 2D PhC is air or a different low-refractive-index medium with a refractive index less than 1.4; the cross section of the high-refractive-index dielectric pillar of the 2D PhC is circular, oval, triangular or polygonal, and the cross section of the high-refractive-index dielectric pillar of the 2D PhC is circular, oval, triangular or polygonal; the 2D-PhC cross-waveguide nonlinear cavity is a 2D-PhC cross-waveguide four-port network formed by high-refractive-index dielectric pillars, the four-port network has a four-port PhC structure, the left port is a first intermediate-signal-input port, the lower port is a second intermediate-signal-input port, the upper port is a signal-output port, and the right port is an idle port; two mutually-orthogonal quasi-1D PhC structures are placed in two waveguide directions crossed at the center of a cross-waveguide, the cross section of the dielectric pillar in the quasi-1D PhC is rectangular, polygonal, circular or oval, and the refractive index of the dielectric pillar is 3.4 or a different value more than 2; the dielectric pillar is arranged in the middle of the cross-waveguide, the dielectric pillar is made of a nonlinear material, the cross section of the dielectric pillar is square, polygonal, circular or oval, and the quasi-1D PhC structures and the dielectric pillar constitute a waveguide defect cavity. The lattice constant of the 2D-PhC array is d, and the array number is 11×11; the circular highrefractive-index linear-dielectric pillar 25 is made of a silicon (Si) material, and has a refractive index of 3.4 and a radius of 0.18d; the first rectangular high-refractive-index linear-dielectric pillar 26 has a refractive index of 3.4, long sides of 0.613d and short sides of 0.162d; the second rectangular high-refractive-index linear-dielectric pillar 27 has a dielectric constant being the same as that of a nonlinear dielectric under low-light-power conditions, and has a dimension equal to that of the first rectangular high-refractive-index linear-dielectric pillar 26; and the central square nonlinear-dielectric pillar 28 is made of a Kerr type nonlinear material, and has a side length of 1.5d, a dielectric constant of 7.9 under low-light-power conditions and a third-order nonlinear coefficient of $1.33 \times 10^{-2}$ $\mu m^2/V^2$. Twelve rectangular high-refractive-index linear-dielectric pillars and one square nonlinear-dielectric pillar are arranged in the center of the 2D PhC cross-waveguide nonlinear cavity in the form of a quasi-1D PhC along longitudinal and transverse waveguide directions, the central nonlinear-dielectric pillar clings to the four adjacent rectangular linear-dielectric pillars and the distance there between is 0, every two adjacent rectangular linear-dielectric pillars are spaced 0.2668d from each other, and the dielectric constant of a rectangular linear pillar clinging to the central nonlinear pillar and close to the signal-output port is equal to that of the central nonlinear pillar under low-light-power conditions.

The present invention can realize an OR-transformation logic gate function of all-optical-logic signals under the cooperation of unit devices such as the optical switch, based on the photonic band gap (PBG) characteristic, quasi-1D PhC defect state, tunneling effect and optical Kerr nonlinear effect of the 2D-PhC cross-waveguide nonlinear cavity shown by PhC-structure unit 02 in FIG. 1. Introduced first is the basic principle of the PhC nonlinear cavity in the present invention: a 2D PhC provides a PBG with certain bandwidth, a light wave with its wavelength falling into this bandgap can be propagated in an optical path designed inside the PhC, and the operating wavelength of the device is thus set to certain wavelength in the PBG; the quasi-1D PhC structure arranged in the center of the cross-waveguide and the nonlinear effect of the central nonlinear-dielectric pillar together provide a defect state mode, which, as the input light wave reaches a certain light intensity, shifts to the operating frequency of the system, so that the structure produces the tunneling effect and signals are output from the output port 24.

Figure 2:
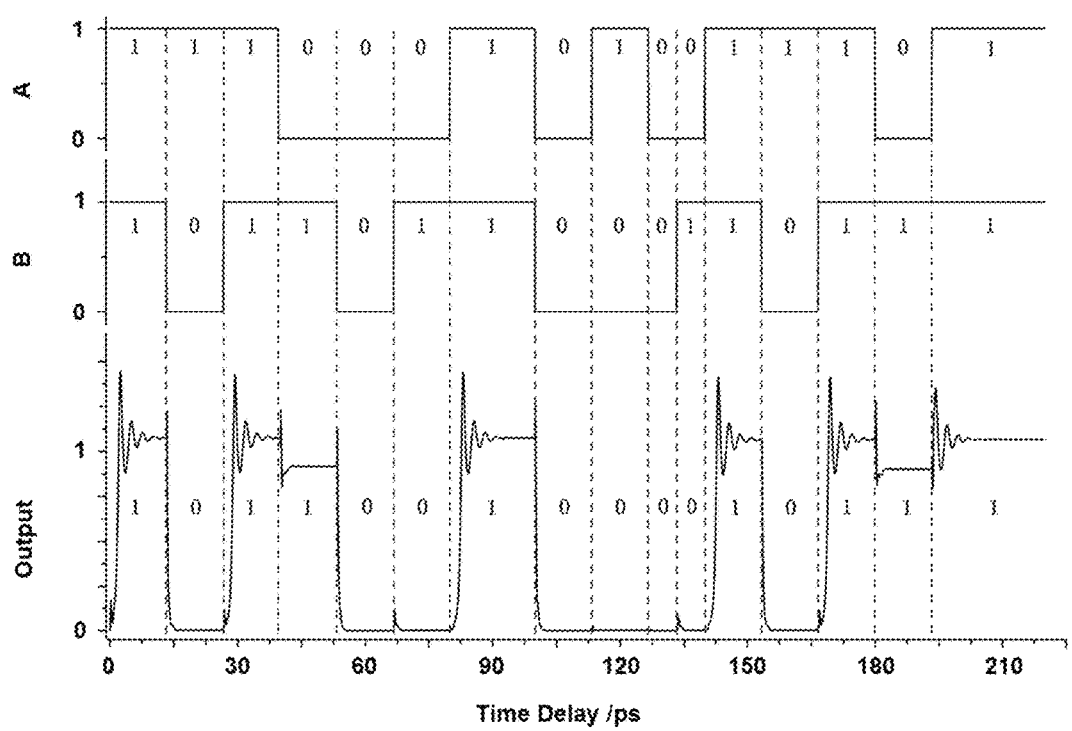
FIG. 2 is a waveform diagram of the basic logic functions of a PhC-structure unit shown in FIG. 1 for the lattice constant d of 1 μm and the operating wavelength of 2.976 μm.
Figure 4:
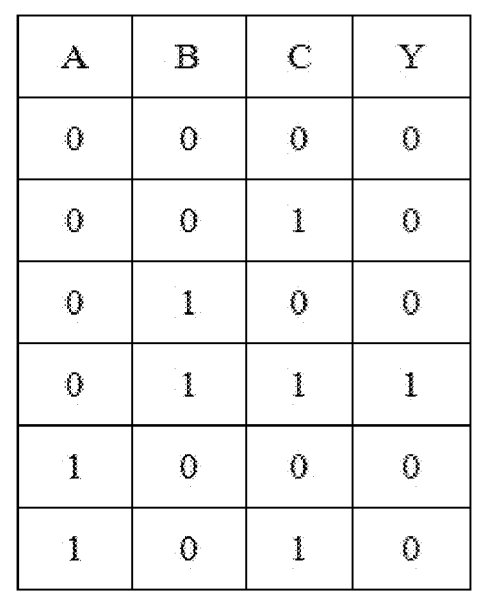

For the lattice constant d of 1 µm and the operating wavelength of 2.976 µm, referring to the 2D PhC cross-waveguide nonlinear cavity shown by PhC-structure unit 02 of FIG. 1, and for a signal A input from the port 21 and a signal B input from the port 22 as shown by the upper two diagrams in FIG. 2, a logic-output waveform at the signal-output port 24 of the 2D PhC cross-waveguide nonlinear cavity of the present invention can be obtained, as illustrated by the lower diagram of signal waveform in FIG. 2. A logic operation truth table shown in FIG. 4 can be obtained according to the logic operation characteristic shown in FIG. 2. In FIG. 4, C is the output at the output port 24 of the PhC-structure unit 02 current state $Q^n$, and Y is signal output of the output port 24 of the PhC-structure unit 02—the next state $Q^{n+1}$. A logic expression of the PhC structure can be obtained according to the truth table:

$$Y = AB + BC \quad (1)$$

That is $$Q^{n+1} = AB + BQ^n \quad (2)$$

According to the basic logic operation characteristic of the above 2D PhC cross-waveguide nonlinear cavity, the logic output at the previous step serves as a logic input to the structure itself to realize logic functions.

Referring to FIG. 1, for CP=0, the optical-selector switch turns the input-signal $X_1$ at the logic-signal-input port 11 to the second intermediate-signal-output port 15 of the optical-selector switch, and the input-signal-$X_1$ is further projected to the second intermediate-signal-input port 22 of the PhC-structure unit 02, i.e., the input signal at the second intermediate-signal-input port 22 of the PhC-structure unit 02 is equal to the input-signal-$X_1$ at the first logic-signal-input port 11; simultaneously, the optical-selector switch turns the reference-light E at the reference-light-input port 13 to the first intermediate-signal-output port 14 of the optical-selector switch, and the reference-light E is further projected to the first intermediate-signal-input port 21 of the PhC-structure unit 02, i.e., the input signal at the first intermediate-signal-input port 21 of the PhC-structure unit 02 is equal to the reference-light E at the reference-light-input port 13; and simultaneously, the optical-selector switch turns the logic-signal $X_2$ at the second logic-signal-input port 12 to the third intermediate-signal-output port 16 of the optical-selector switch, and the logic-signal $X_2$ is further projected to the WAL 04.

For CP=1, the optical-selector switch turns the input-signal $X_1$ at the first logic-signal-input port 11 to the third intermediate-signal-output port 16 of the optical-selector switch, and the input-signal $X_1$ is further projected to the WAL 04; simultaneously, the optical-selector switch turns the logic-signal $X_2$ at the second logic-signal-input port 12 to the first intermediate-signal-output port 14 of the optical-selector switch, and the logic-signal $X_2$ is projected to the first intermediate-signal-input port 21 of the PhC-structure unit 02, i.e., the input signal at the first intermediate-signal-input port 21 of the PhC-structure unit 02 is equal to the logic-signal $X_2$ at the second logic-signal-input port 12; and simultaneously, the optical-selector switch turns the reference-light E at the reference-light-input port 13 to the second intermediate-signal-output port 15 of the optical-selector switch, and the reference-light E is further projected to the second intermediate-signal-input port 22 of the PhC-structure unit 02, i.e., the input signal at the second intermediate-signal-input port 22 of the PhC-structure unit 02 is equal to the reference-light E at the reference-light-input port 13.

With the cooperation described above, the OR transformation logic function of all-optical-logic signals can be realized.

The 2D PhC structure of the device in the present invention can be of a (2k+1)×(2k+1) array structure, where k is an integer more than or equal to 3. Design and simulation results will be provided below in an embodiment given in combination with the accompanying drawings, wherein the embodiment is exemplified by an 11×11 array structure and a lattice constant d of 0.5208 µm.

In formula (5), suppose A=1, leading to:

$$Q^{n+1} = B \quad (3)$$

In formula (5), suppose B=1, leading to:

$$Q^{n+1} = A + Q^n \quad (4)$$

Thus, the first signal $X_1$ is input to the second intermediate-signal-input port 22 of a PhC-structural unit 02 at the moment $t_n$, i.e., $B = X_1$; simultaneously, supposing that the input-signal A of the port 21 is equal to 1, the logic-input-signal $X_1(t_n)$ at the moment $t_n$ is stored in an optical circuit;

then, at the moment $t_{n+1}$, the second signal $X_2$ is input to the first intermediate-signal-input port 21 of the PhC-structural unit 02, i.e., the logic-input-signal A of the first intermediate-signal-input port 21 at the moment is equal to $X_2$ ($t_{n+1}$), and simultaneously, supposing that the logic-input-signal B of the second intermediate-signal-input port 22 is equal to 1. The output-signal 24 of the PhC-structural unit 02 is:

$$Q^{n+1}=X_1(t_n)+X_2(t_{n+1}) \tag{5}$$

Hence, a CP control signal, an optical switch and a reference-light source need to be introduced into the system; as CP=0, the optical switch 01 projects the first signal $X_1$ to the second intermediate-signal-input port 22, and simultaneously projects the signal "1" to the first intermediate-signal-input port 21; and for CP=1, the optical switch 01 projects the second signal $X_2$ to the first intermediate-signal-input port 21, and simultaneously projects the signal "1" to the second intermediate-signal-input port 22.

The optical-selector switch operates as follows under the control of a clock-signal CP:

At a moment $t_n$, CP is made equal to 0, the optical-selector switch turns the first signal $X_1$ ($t_n$) at the first logic-signal-input port 11 to the second intermediate-signal-output port, and the delay signal $X_1$ ($t_n$) is further projected to the second intermediate-signal-input port 22 of the PhC-structure unit 02; simultaneously, the optical-selector switch turns the second signal $X_2$ ($t_n$) at the second logic-signal-input port 12 to the third intermediate-signal-output port 16, and the second signal $X_2$ ($t_n$) is further projected to the WAL 04, and simultaneously, the optical-selector switch turns the reference-light E of the reference-light-input port 13 to the first intermediate-signal-output port 14, and the reference-light E is further projected to the first intermediate-signal-input port 21 of the PhC-structure unit 02; the output of the port 24 at this moment can be obtained from the expression (2):

$$Q^{n+1}=X_1(t_n) \tag{6}$$

At a moment $t_{n+1}$, CP is made equal to 1, the optical-selector switch turns the signal $X_1(t_{n+1})$ at the first logic-signal-input port 11 to the third intermediate-signal-output port 16, and the delay-signal $X_1(t_{n+1})$ is further projected to the WAL 04; simultaneously, the optical-selector switch turns the second signal $X_2(t_{n+1})$ at the second logic-signal-input port 12 to the first intermediate-signal-output port 14, and the second signal $X_2(t_{n+1})$ is further projected to the first intermediate-signal-input port 21 of the PhC-structure unit 02; and simultaneously, the optical-selector switch turns the reference-light E at the reference-light-input port 13 to the second intermediate-signal-output port 15, and the reference-light E is further projected to the second intermediate-signal-input port 22 of the PhC-structure unit 02; the output at the port 24 at this moment can be obtained from the expression (2):

$$Q^{n+1}=X_2(t_{n+1})+X_1(t_n) \tag{7}$$

The output at the output port 24 of the PhC-structure unit 02 is equal to the input at the D-signal-input port 52 of the DFF unit 05, and it can be obtained from the expressions (6) and (7) that the input-signal D of the D-signal-input port 52 is $X_1$ ($t_n$) for CP=0 and is $X_2(t_{n+1})+X_1$ ($t_n$) for CP=1.

It can be known according to the logic characteristic of the DFF that for CP=1, the system output follows with the input-signal D; and for CP=0, the system output keeps the input-signal D at the previous moment. Thus, it can be known that the output $Q^{n+1}$ at the system-output port 53 of the device in the present invention is $Q^{n+1}=X_2(t_{n+1})+X_1(t_n)$ for CP=1; and at a next moment for CP=0, the system output keeps the output of the previous moment, i.e., the system output in a clock cycle is:

$$Q^{n+1}=X_2(n+1)+X_1(n) \tag{8}$$

Hence, the device in the present invention can realize the OR-transformation logic function of two logic signals.

For the operating wavelength of 1.55 μm in the device, the lattice constant d is 0.5208 μm for the PhC-structure unit 02, the radius of the circular high-refractive-index linear-dielectric pillar 25 is 0.093744 μm; the long sides of the first rectangular high-refractive-index linear-dielectric pillar 26 are 0.3192504 μm, and the short sides are 0.0843696 μm; the size of the second rectangular high-refractive-index linear-dielectric pillar 27 is the same as that of the first rectangular high-refractive-index linear-dielectric pillar 26; the side length of the central square nonlinear-dielectric pillar 28 is 0.7812 μm, and the third-order nonlinear coefficient is $1.33 \times 10^{-2}$ μm$^2$/V$^2$; and the distance between every two adjacent rectangular linear-dielectric pillars is 0.13894944 μm. Based on the above dimensional parameters, as the first logic-signal $X_1$ and the second logic-signal $X_2$ are input according to the waveforms shown in FIG. 3, a system-output waveform diagram at the lower part in FIG. 3 can be obtained under the control of the clock-signal CP. Hence, the system carries out OR-logic operation on the logic-input quantity $X_2$ (n+1) and the logic-input quantity $X_1$(n) at the previous moment. That is, the OR-transformation logic function of two logic signals is realized.

Figure 3:
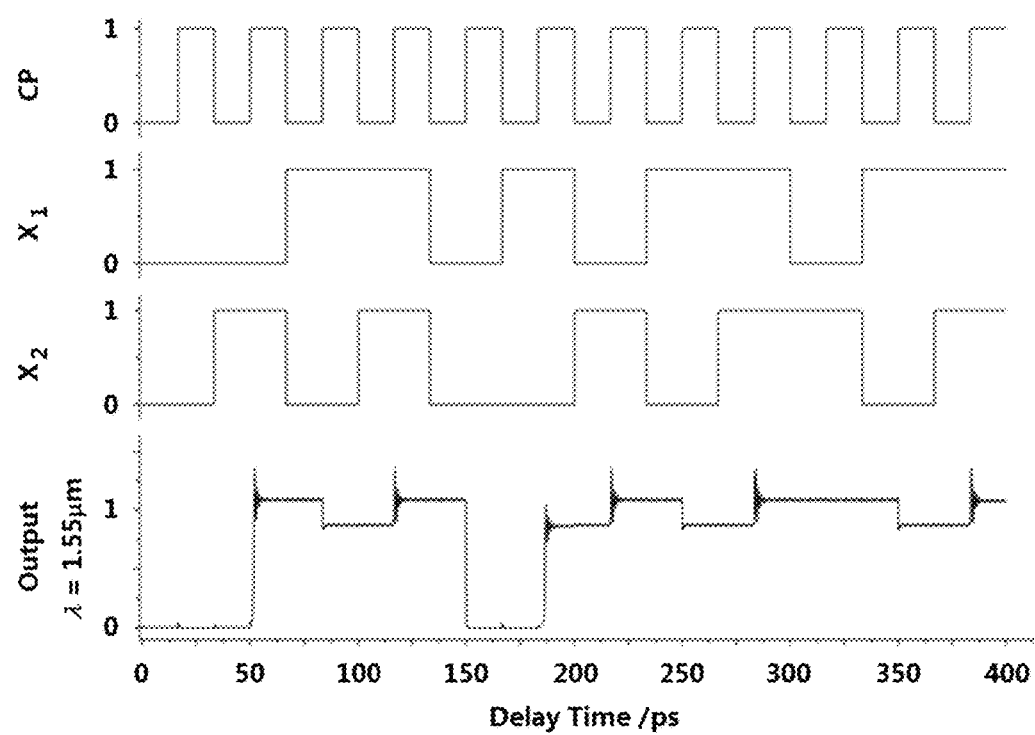
FIG. 3 is a waveform diagram of two logic-signal all-optical OR-transformation logic function of the present invention for the lattice constant d of 0.5208 μm and the operating wavelength of 1.55 μm.

With reference to FIG. 3, the device in the present invention can realize the same logic function under different lattice constants and corresponding operating wavelengths by scaling.

In conclusion, an OR-transformation logic function of two all-optical-logic signals in the present invention can be realized by the control of the clock-signal CP of the clock-signal-input port under the coordination of relevant unit devices.

In the logic-signal processing in an integrated optical circuit, self-convolution operation of a single logic signal can be defined, and the above-mentioned logic operation of logic signals is a basic operation of the self-convolution operation of two logic signals. The OR-transformation logic function of logic signals realized in the present invention plays an important role in realizing self-correlation transformation or self-convolution operation of logic variables.

While the invention has been described in terms of various specific embodiments, those skilled in the art will recognize that the invention can be practiced with modification within the spirit and scope of the claims.

What is claimed is:

1. A photonic crystal (PhC) all-optical OR-transformation logic gate, comprising:

an optical switch unit (OSU), a PhC-structure unit, a reference light, a wave-absorbing load (WAL) and a D-Type flip-flop (DFF) unit: two system-signal-input ports of the OSU are respectively connected with a first logic-signal ($X_1$) and a second logic-signal ($X_2$) of the OSU; said reference light of the OSU is connected with a reference-light-input port of said OSU; three intermediate-signal-output ports of the OSU respectively connected with two intermediate-signal input ports of the PhC-structure and the WAL; a clock-signal (CP) through a input port of a two-branch waveguide are respectively connected with a first CP-input port of said OSU and a second CP-input port of said DFF unit; and a signal-output port of said PhC-structure unit is connected with a D-signal-input port of said DFF unit.

2. The PhC all-optical OR-transformation logic gate of claim 1, wherein said OSS) is a 3×3 optical gating switch.

3. The PhC all-optical OR-transformation logic gate of claim 1, wherein said PhC-structure unit is a two-dimensional photonic crystal (2D PhC) cross-waveguide nonlinear cavity; said PhC-structure unit is a 2D PhC cross-waveguide four-port network formed by high-refractive-index linear-dielectric pillars, a left port of the four-port network is the first intermediate-signal-input port, a lower port is the second intermediate-signal-input port, an upper port is the signal-output port, and a right port is an idle port; two mutually-orthogonal quasi-one-dimensional (quasi-1D) PhC structures are placed along longitudinal direction in vertical waveguide and transverse direction in horizontal waveguide at a center of a cross waveguide, a nonlinear-dielectric pillar is arranged in a middle of the cross waveguide, a nonlinear-dielectric pillar is a nonlinear material, a cross section of the nonlinear-dielectric pillar is square, polygonal, circular, or oval; a dielectric constant of rectangular high-refractive-index linear-dielectric pillars clinging to the nonlinear-dielectric pillar and close to the signal-output port of the PhC-structure unit is equal to that of the nonlinear-dielectric pillar under weak light conditions; and said quasi-1D PhC structures and the nonlinear-dielectric pillar constitute a waveguide defect cavity.

4. The PhC all-optical OR-transformation logic gate of claim 1, wherein said DFF unit includes a clock-signal input port, a D-signal-input port and a system output port; and an input signal of the D-signal-input port of said DFF unit is equal to an output signal of the signal-output port of said PhC-structure unit.

5. The PhC all-optical OR-transformation logic gate of claim 3, wherein said 2D PhC is a (2k+1)×(2k+1) array structure, where k is an integer more than or equal to 3.

6. The PhC all-optical OR-transformation logic gate of claim 3, wherein a cross section of the high-refractive-index linear-dielectric pillar of the 2D PhC is circular, oval, triangular, or polygonal.

7. The PhC all-optical OR-transformation logic gate of claim 3, wherein a background filling material for the 2D PhC is a low-refractive-index dielectric having a refractive index less than 1.4.

8. The PhC all-optical OR-transformation logic gate of claim 3, wherein a background filling material for the 2D PhC is air.

9. The PhC all-optical OR-transformation logic gate of claim 3, wherein a cross section of the high-refractive-index linear-dielectric pillar of the cross waveguide is rectangular, polygonal, circular, or oval.

10. The PhC all-optical OR-transformation logic gate of claim 3, wherein high-refractive-index linear-dielectric pillar of the cross waveguide has a refractive index of value more than 2.

11. The PhC all-optical OR-transformation logic gate of claim 3, wherein high-refractive-index linear-dielectric pillar of the cross waveguide has a refractive index of 3.4.

\* \* \* \* \*